Nov. 1, 1949     G. O. GABRIEL     2,486,741
SHOCK ABSORBING MECHANISM
Filed Jan. 4, 1946
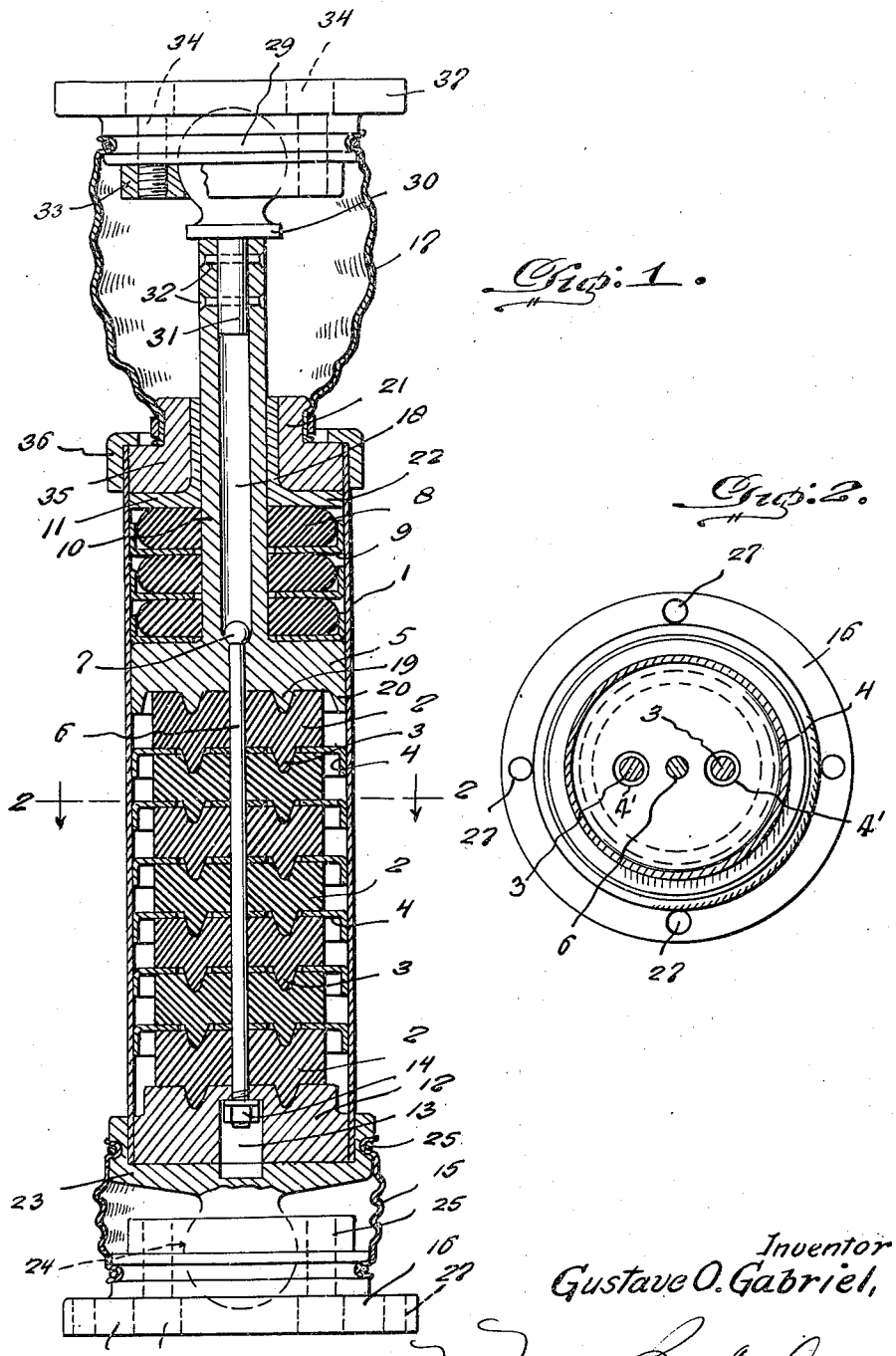
Inventor
Gustave O. Gabriel, Patented Nov. 1, 1949

2,486,741

UNITED STATES PATENT OFFICE 2,486,741

SHOCK ABSORBING MECHANISM

Gustave O. Gabriel, New York, N. Y., assignor, by mesne assignments, of one-half to Perma Realty Co., New York, N. Y.

Application January 4, 1946, Serial No. 639,109

3 Claims. (Cl. 267—63)

This invention relates to improvements in shock absorbing mechanisms.

It is an object of the invention to provide a shock absorbing mechanism comprising a plurality of cushioning elements in the form of compressible rubber pads, so designed that the material of each mat is adapted to be displaced to permit distortion of each pad under compression to provide the required resilient action.

It is a further object of the invention to provide a construction of the character described comprised of a plurality of distortable members arranged in series for simultaneous compression.

It is a further object of the invention to provide a shock absorber which is of simple construction, requiring no precision machining, and no lubrication.

It is a still further object of the invention to provide a device of the character described which requires no oil, and consequently which dispenses with the necessity for oil refills, temperature control, adjustments, maintenance difficulties and parts replacement.

It is a further object of the invention to provide a device of the above character which will function properly in any attitude, and which shall have application to farm tractors, motorcycles, automobiles, air-borne vehicles, and other analogous uses, it being understood however, that the size of the unit required for each distinct use may vary.

Still further objects of the invention will become apparent upon study of the following description, when taken in conjunction with the accompanying drawings, wherein:

Figure 1 is a vertical axial section taken through an embodiment of the invention; and Figure 2 is a section taken on the line 2—2 of Figure 1.

Referring now to the drawings in detail, the numeral 1 refers to a cylindrical steel open-ended casing or housing, preferably constructed of stainless steel tube, and housing a plurality of moulded rubber blocks 2, each block having a central aperture adapted for passage of the axial rod 6, and having further a pair of teats 3 on one face of each block and a pair of matching pockets on the other face. The blocks 2 are stacked with teats 3 fitting into the matching pockets, whereby rotational motion of one block with respect to another is prevented.

The blocks 2 are constructed of a special rubber which flexes in a range of temperatures between 50 degrees below zero to 150 degrees above zero, on the Fahrenheit scale, and therefore permits operation of the device in all weathers.

Separating the rubber pads 2 are a series of cups 4, having apertures 4' therein for permitting passage of the teats 3. The cups are fabricated of aluminum and comprise annular shoulders having an outside diameter slightly smaller than the inside diameter of the tube 1. Increase in shock pressure causes the rubber pads 2 to expand against the inside surfaces of the annular shoulders of the cups 4, no rubbing action taking place between the pads 2 and the inner walls of the cylinder 1. The apertures 4' in the cups 4 and the teats 3 of the blocks 2 constitute interengaging means for preventing rotational motion of one block with respect to another.

The cups 4 themselves bear on the inside surface of the cylinder 1 frictionally, the friction increasing on the downward stroke and decreasing on the upward stroke.

The pads 2 and the cups 4 are assembled on a rod 6, which extends axially through the central apertures in the rubber pads 2 and the cups 4, and which engages at one end a locking plate 12 having pockets for engaging the teats 3 of the lowermost pad 2, and having a central axial aperture through which extends the rod 6, said aperture being enlarged in part to form a receptacle 13 for nesting a nut 14 which threadably engages the threaded end of the rod 6.

A further end of the rod 6 bears a nob 7, larger than the rod diameter, which slidably engages in an axial hole 18, of circular cross section in a piston rod 10.

The stack of rubber pads, which, as has been stated, is capped at one end by plate 12 is engaged at the other end by a piston 5, having teats 19, engaging pockets in an adjacent pad 2, and an overhanging annular shoulder 20, for preventing frictional engagement of this adjacent pad 2 with the inner surface of the tube 1.

The piston 5 is integrally secured to a piston rod 10, on which are aligned a plurality of rubber pads 8, not provided with teats and pockets, but provided only with cup separators 9. The pads 8 and the cups 9 are assembled between the rearward face of the piston 5 and a reinforced Bakelite liner 11, having a cylindrical portion 21 surrounding a portion of the piston 10, and comprising an annular shoulder 22 closely fitting the inside of the cylinder 1.

In assembling the device the pads 8 and their associated cups 9 are slipped over the piston rod to the back face of the piston. The cylinder is then conditioned by pulling on the piston rod 10. The pads 2 and the cups 4 are now assembled and the end locking plate 12 pressed into the cylinder bore, forcing the pads 2 and cups 4 into a so-called semi-preload position. Thereafter, locking plate 12 is locked in place.

The cylinder 1 is covered at one end by a cover member 23, secured to the cylinder 1, and comprising a knob 24 integral therewith. The knob 24 is secured between two plates 25 and 26 by means of bolts 27 having heads 28 engaging in plate 26 and threaded ends for threadedly engaging the plate 25, the plate 26 thereby providing a swivel cover plate. The plate 26 is provided with a socket for receiving the knob 24.

The piston 10 is provided at one end with a knob 29 having a shoulder 30 and a pin 31, the pin 31 engaging within the axial hole 18 and being secured to the piston by transverse rivets 32 extending through the walls of the piston and through the pin 31.

The knob 29 is clamped between plates 33 and 37 by means of bolts 34 which threadedly engage the plate 33. Plate 37 has a socket for receiving knob 29 and thereby provides a swivel cover plate.

Gaiters 15 and 17 are secured in suitable manner; the gaiter 15 between member 23 and plate 26, and the gaiter 17 between plug 35 and plate 33. The plug 35 provides an end closure for the cylinder and surrounds the liner 21, and is retained in the cylinder 1 by means of an annular retaining ring 36 secured externally of the cylinder 1 and bent to extend over and retain the plug 35.

Having described an embodiment of the invention it is to be understood that modifications of the arrangement and of the details of construction may be resorted to without violating the spirit of the invention or the scope of the appended claims.

What I claim is:

1. A shock absorber comprising an open-ended casing, a cover member provided with a knob arranged across the bottom of said casing and secured to the latter, a gaiter arranged in surrounding relation with respect to the knob of said cover member and carried by the latter, a plate provided with a socket secured to said gaiter, the knob of the cover member being in engagement with said socket, a piston within said casing and arranged in spaced relation with respect to said cover member, a piston rod provided with an axial hole extending therethrough on said piston, means extending downwardly from said piston to said cover member and secured to the latter, a stack of resilient blocks interposed between said piston and said cover member, a plurality of cups surrounding and separating each block from each other and from said casing, interengaging means on said cups and blocks to prevent rotational motion of one block with respect to another, a plug surrounding said piston rod and secured to the opposite end of said casing, a knob carried by said piston rod, a second gaiter surrounding the knob on the piston rod and carried by the plug, a second plate provided with a socket secured to said second gaiter, the knob on the piston rod being in engagement with the socket on said second-named plate, and a second stack of resilient blocks surrounding the piston rod and mounted intermediate said piston and said plug.

2. A shock absorber comprising an open-ended casing, a cover member provided with a knob arranged across the bottom of said casing and secured to the latter, a gaiter arranged in surrounding relation with respect to the knob of said cover member and carried by the latter, a plate provided with a socket secured to said gaiter, the knob of the cover member being in engagement with said socket, a piston within said casing and arranged in spaced relation with respect to said cover member, a piston rod provided with an axial hole extending therethrough on said piston, means extending downwardly from said piston to said cover member and secured to the latter, said means comprising a rod having a knob on one end thereof, and having its other end secured to said cover member, the knob on said rod slidably engaging the axial hole, a stack of resilient blocks interposed between said piston and said cover member, a plurality of cups surrounding and separating each block from each other and from said casing, interengaging means on said cups and blocks to prevent rotational motion of one block with respect to another, a plug surrounding said piston rod and secured to the opposite end of said casing, a knob carried by said piston rod, a second gaiter surrounding the knob on the piston rod and carried by the plug, a second plate provided with a socket secured to said second gaiter, the knob on the piston rod being in engagement with the socket in said second-named plate, and a second stack of resilient blocks surrounding the piston rod and mounted intermediate said piston and said plug.

3. A shock absorber comprising an open-ended casing, a cover member provided with a knob arranged across the bottom of said casing and secured to the latter, a gaiter arranged in surrounding relation with respect to the knob of said cover member and carried by the latter, a plate provided with a socket secured to said gaiter, the knob of the cover member being in engagement with said socket, a piston within said casing and arranged in spaced relation with respect to said cover member, a piston rod provided with an axial hole extending therethrough on said piston, means extending downwardly from said piston to said cover member and secured to the latter, a stack of resilient blocks interposed between said piston and said cover member, each of said blocks being provided on its face with teats and pockets on its opposite face, a plurality of cups surrounding and separating each block from each other and from said casing, each of said cups being provided with apertures extending therethrough, the teats on the one block being arranged in registry with the openings in the cups and the pockets in the block complemental thereto and extending through the latter to thereby prevent rotational motion of the respective blocks relative to each other, a plug surrounding said piston rod and secured to the opposite end of said casing, a knob carried by said piston rod, a second gaiter surrounding the knob on the piston rod and carried by the plug, a second plate provided with a socket secured to said second gaiter, the knob on the piston rod being in engagement with the socket on said second-named plate, and a second stack of resilient blocks surrounding the piston rod and mounted intermediate said piston and said plug.

GUSTAVE O. GABRIEL.

REFERENCES CITED

The following references are of record in the file of this patent:

UNITED STATES PATENTS

| Number | Name | Date |
| --- | --- | --- |
| 1,205,106 | Oxnard | Nov. 14, 1916 |
| 1,544,032 | Potez | June 30, 1925 |
| 1,703,222 | Brimm | Feb. 26, 1929 |
| 1,772,414 | Brooke-Hunt et al. | Aug. 5, 1930 |
| 1,871,390 | Reynolds | Aug. 9, 1932 |
| 2,187,156 | Johnson | Jan. 16, 1940 |

FOREIGN PATENTS

| Number | Country | Date |
| --- | --- | --- |
| 136,361 | Great Britain | Dec. 18, 1919 |
| 375,954 | Great Britain | July 7, 1932 |
| 727,324 | France | Mar. 22, 1932 |